(12) United States Patent
Chen et al.

(10) Patent No.: US 10,648,782 B2
(45) Date of Patent: May 12, 2020

(54) COLD FIREWORK SPURTING APPARATUS

(71) Applicant: Showven Technologies Co., Ltd., Changsha, Hunan Province (CN)

(72) Inventors: Jiangbo Chen, Liuyang (CN); Xiaowen Zhou, Liuyang (CN); Tongxiang Wang, Liuyang (CN); Ling Yu, Liuyang (CN)

(73) Assignee: Showven Technologies Co., Ltd., Changsha (CN)

( * ) Notice: Subject to any disclaimer, the term of this patent is extended or adjusted under 35 U.S.C. 154(b) by 0 days.

(21) Appl. No.: 15/318,531

(22) PCT Filed: Dec. 30, 2015

(86) PCT No.: PCT/CN2015/099848
§ 371 (c)(1),
(2) Date: Dec. 13, 2016

(87) PCT Pub. No.: WO2017/075892
PCT Pub. Date: May 11, 2017

(65) Prior Publication Data
US 2018/0238664 A1 Aug. 23, 2018

(30) Foreign Application Priority Data
Nov. 3, 2015 (CN) .......................... 2015 1 0737062

(51) Int. Cl.
*F42B 4/00* (2006.01)
*B65G 53/48* (2006.01)
(Continued)

(52) U.S. Cl.
CPC ................ *F42B 4/00* (2013.01); *B65G 53/48* (2013.01); *F42B 4/18* (2013.01); *F42B 4/26* (2013.01)

(58) Field of Classification Search
USPC ........................................................ 431/365
See application file for complete search history.

(56) References Cited

U.S. PATENT DOCUMENTS 4,290,267 A * 9/1981 Buchner ................... F01K 3/10
123/3
2003/0150370 A1 8/2003 Lazecki
(Continued)

FOREIGN PATENT DOCUMENTS

| CN | 101862544 A | 10/2010 |
| CN | 203719544 U | 7/2014 |

(Continued)

OTHER PUBLICATIONS

"European Application Serial No. 15894516.2, Extended European Search Report dated Dec. 15, 2017", (dated Dec. 15, 2017), 9 pgs.
(Continued)

*Primary Examiner* — Grant Moubry
*Assistant Examiner* — Aaron H Heyamoto
(74) *Attorney, Agent, or Firm* — Schwegman Lundberg & Woessner, P.A.

(57) ABSTRACT

The present disclosure provides a cold firework spurting apparatus, comprising: a feeding device; a conveying device; a heating mechanism; and a spurting device configured to ignite and spurt the metal powder heated by the heating mechanism, wherein an output end of the feeding device is open to the conveying device and an output end of the conveying device is open to the spurting device. Accordingly, the metal powder inside the conveying device is continuously heated by the heating mechanism attached to the conveying device during the conveying process such that the metal powder is constantly heated during the conveying process so as to form the metal powder ignited at high temperature. The ignited metal powder at high temperature is led and spurted outwards by means of an air flow formed (Continued)

by the spurting device so as to form a spurting effect of cold firework.

10 Claims, 8 Drawing Sheets

(51) Int. Cl.
   *F42B 4/26* (2006.01)
   *F42B 4/18* (2006.01)

(56) References Cited

U.S. PATENT DOCUMENTS

| | | | |
|---|---|---|---|
| 2004/0113300 A1* | 6/2004 | Jurgens | B01J 2/04 264/9 |
| 2011/0033805 A1* | 2/2011 | Multamaki | A63J 5/023 431/8 |

FOREIGN PATENT DOCUMENTS

| | | | | |
|---|---|---|---|---|
| CN | 103964205 | A | * | 8/2014 |
| CN | 103964205 | A | | 8/2014 |
| CN | 203782216 | U | | 8/2014 |
| CN | 204202494 | U | * | 3/2015 |
| CN | 204202494 | U | | 3/2015 |
| CN | 205102695 | U | | 3/2016 |

OTHER PUBLICATIONS

"Australian Application Serial No. 2015397808 Examination Report dated Sep. 27, 2017", (dated Sep. 27, 2017), 3 pgs.

"Chinese Application No. 201510737062.5, Office Action dated May 19, 2016", w/ English Translation, (dated May 19, 2016), 11 pgs.

"Chinese Application No. 201510737062.5, Office Action dated Aug. 23, 2016", w/ English Translation, (dated Aug. 23, 2016), 10 pgs.

"Chinese Application No. 201510737062.5, Office Action dated Nov. 3, 2016", W/ English Translation, (dated Nov. 3, 2016), 13 pgs.

"International Application No. PCT/CN2015/099848, International Search Report dated Jul. 27, 2016", (dated Jul. 27, 2016), 5 pgs.

"International Application No. PCT/CN2015/099848, Written Opinion dated Jul. 27, 2016", w/ English Translation, (dated Jul. 27, 2016), 7 pgs.

"Australian Application Serial No. 2018236816, Examination Report dated Apr. 12, 2019", (dated Apr. 12, 2019), 3 pgs.

"Australian Application No. 2018236816 Office Action dated Oct. 27, 2019", 4 pgs.

"European Application Serial No. 15 984 516.2, Office Action dated Jan. 17, 2020", (dated Jan. 17, 2020), 5 pgs.

* cited by examiner

COLD FIREWORK SPURTING APPARATUS

PRIORITY APPLICATIONS

This application is a U.S. National Stage Filing under 35 U.S.C. 371 from International Application No. PCT/CN2015/099848, filed on 30 Dec. 2015, and published as WO2017/075892 on May 11, 2017, which claims the benefit of priority to Chinese Application No. 201510737062.5, filed on 3 Nov. 2015; which applications and publication are incorporated herein by reference in their entirety.

BACKGROUND OF THE INVENTION

Field of the Invention

The present disclosure relates to a field of a cold firework spurting apparatus, more particularly, relates to a cold firework spurting apparatus.

Description of the Related Art

Nowadays, a variety of stage performance activities are mostly be brought into an enthusiastic atmosphere by setting off cold firework so as to lead to a climax of the stage performance. The cold firework has a great effect in achieving the stage effect. At present, the cold firework set off on the stage generally employs a disposable cold firework barrel, which is filled with a mixture of gunpowder and metal powder, and in which an igniter is disposed. When the cold firework is set off, the gunpowder is ignited by a spark generated by the igniter which is electrically connected and controlled. The metal powder mixed with the gunpowder is ignited by a high temperature produced by the combustion of the gunpowder, and the ignited metal powder is spurted by a high pressure produced by the gunpowder so as to achieve a cold firework effect. Owing to the present of the gunpowder, there is certain safety concern during the production, transporting, and setting off of such kind of cold firework barrel. The igniter used in this kind of cold firework barrel is a kind of hazardous and explosive articles, which will be easily disassembled by a law-breaker for the purpose of illegal use so as to cause some public safety accidents. Further, a great deal of smoke and irritant gas will be produce when this kind of cold firework barrel is set off, which easily contaminates the environment. There are many drawbacks for the cold firework produced by such a cold firework barrel, such as short spurting time of the flame, uncontrollable spurting time and un-recyclable of the cold firework barrel.

Recently, there is a cold firework spurting apparatus, in which the metal powder is continuously supplied by a metal powder feeding device, and the cold firework is continuously generated in the manner of exciting the metal powder. However, there are still some drawbacks in the current cold firework spurting apparatus, for example, the stability of the feeding and conveying of the metal powder is hard to be controlled, the feeding and conveying of the metal powder is easily be interrupted, and cannot be continue and constant, such that the effect of the spurting of cold firework cannot be controlled and the function of achieving a visual stage effect cannot be realized.

SUMMARY OF THE INVENTION

In view of the above-mentioned drawbacks, the main object of the present disclosure is to provide a cold firework spurting apparatus which uses no hazardous gunpowder, and can continuously and uniformly feed and convey metal powder so as to easily control the stability of the feeding and conveying of the metal powder and efficiently control the spurting effect of the cold firework.

There is provides a cold firework spurting apparatus, comprising: a feeding device configured to continuously feed material by continuously propelling metal powder through rotation; a conveying device configured to convey material by continuously propelling the metal powder fed by the feeding device through rotation; a heating mechanism attached to the conveying device and configured to heat the metal powder during the conveying process of the conveying device; and a spurting device configured to ignite and spurt the metal powder heated by the heating mechanism, wherein an output end of the feeding device is open to the conveying device and an output end of the conveying device is open to the spurting device.

Further, the feeding device comprises a loading hopper for storing the metal powder and a feeding hopper for feeding the metal powder; a rotary feeding mechanism, which continuously propels the metal powder inside the loading hopper into the feeding hopper through circumferential rotation, is provided between a lower portion of the loading hopper and an upper portion of the feeding hopper; the rotary feeding mechanism is mounted on the loading hopper, an output end of the rotary feeding mechanism is directed to an inside of the feeding hopper, and an output end of the feeding hopper is open to the conveying device.

Further, the rotary feeding mechanism comprises a feeding control tube for communicating the loading hopper with the feeding hopper, a feeding roll shaft axially provided within the feeding control tube and configured to continuously feed the metal powder inside the loading hopper into the feeding hopper through rotation, and a feeding drive motor for driving the feeding roll shaft to rotate; a surface of the feeding roll shaft is provided with continuous spiral feeding projection structures and/or continuous spiral feeding recession structures.

Further, the spiral feeding projection structures are of equal radius or of gradually reduced radius in the direction from the loading hopper to the feeding hopper; and/or the spiral feeding recession structures are of equal radius or of gradually increased radius in the direction from the loading hopper to the feeding hopper.

Further, the conveying device comprises a conveying channel for receiving the metal powder continuously dropped from the feeding device and conveying the metal powder to the spurting device, the conveying channel is provided with a material inlet arranged to correspond to a feeding port of the feeding device; the rotary conveying roll, arranged in an axial direction of the conveying channel and configured to continuously convey and propel the metal powder dropped from the feeding device to the spurting device through circumferential rotation, is provided within the conveying channel; an outer surface of the rotary conveying roll is provided with continuous spiral feeding projection structures and/or continuous spiral feeding recession structures.

Further, the spiral feeding projection structures are of equal radius or of gradually reduced radius in the direction from the material inlet to the spurting device; and/or the spiral feeding recession structures are of equal radius or of gradually increased radius in the direction from the material inlet to the spurting device.

Further, the heating mechanism comprises a heating loop close to an outer wall of the conveying channel, the heating loop is distributed from the material inlet to the spurting device, the heating loop is provided outside with a thermal insulation sleeve for insulation and preventing the heat from leakage, the heating loop generates heat with an alternative current or an electro-magnetic induction, and at least one end of the conveying channel is provided with a heat insulation gasket for insulation and preventing the heat from leakage.

Further, the spurting device comprises an outlet tube for spurting the ignited metal powder by a gas flow, the outlet tube comprises an inlet end for communicating with an exit of the blower, an ignition portion for receiving and igniting the metal powder at high temperature, a spurting portion for spurting out the ignited metal powder, and a spurting port for spurting cold fireworks outwards; the ignition portion and the spurting portion are coaxially arranged; a first end of the ignition portion is open to an exit of the blower via the inlet end; the second end of the ignition portion is open to a first end of the spurting portion, and a second end of the spurting portion is open to an outside environment via the spurting port; an output end of the conveying device is open to an inside of the ignition portion from a side wall of the ignition portion; an inner wall of the outlet tube is provided with at least one anti-adhesion layer for preventing the metal powder from adhering to the inner wall of the outlet tube and being resistant to high temperature.

Further, the ignition portion has a radius less than that of the spurting portion so as to form a flaring structure in the direction from the ignition portion to the spurting portion; a smooth transition segment or a mutation transition segment is provided between the ignition portion and the spurting portion; the inlet end of the outlet tube is provided with a heat insulation gasket neat the exit of the blower for preventing the heat inside the outlet tube from diffusing towards the blower, and/or the spurting port of the outlet tube is provided with a heat insulation gasket at the outlet for preventing the heat inside the outlet tube from diffusing outwards.

Further, the anti-adhesion layer is a sprayed layer sprayed on an inner wall surface of the outlet tube, or a layer adhered on the inner wall surface of the outlet tube, and the anti-adhesion layer is a layer of polytetrafluoroethyleneor a layer of Teflon.

The present disclosure has the following advantages:

In the cold firework spurting apparatus, since the hazardous gunpowder is not necessary, there is no danger during the production, transport and the setting off process. Furthermore, since the igniter is also not necessary, there is no risk that the igniter is disassembled by a law-breaker for the purpose of illegal use so as to cause some public safety accidents. Still further, with the feeding device continuously rotating, the continuous rotary force is transferred into an axial propelling force so as to propel and convey the metal powder continuously towards the conveying device. The metal powder dropped from the feeding device is propelled and conveyed towards the spurting device by the continuous rotation of the conveying device, and the metal powder inside the conveying device is continuously heated during the conveying process by the heating mechanism attached to the conveying device such that the metal powder during the conveying process is constantly heated so as to form the metal powder at high temperature to be ignited at a conveying outlet. The ignited metal powder at high temperature is led and spurted outwards by means of an air flow formed by the spurting device so as to achieve a spurting effect of cold firework. Accordingly, it can ensure the continuity and uniformity of the feeding of the metal powder and cause no interruption during the feeding process of the metal powder. The feeding amount of the metal powder during the feeding process will remain constant due to the stable rotation and the consistency of the surface condition of the rotators, such that the metal powder is conveyed to the spurting device at constant amount and speed so as to control the spurting effect of the cold firework well and achieve a better stage effect of the cold firework. Therefore, this kind cold firework spurting apparatus can be used to the indoor or outdoor stage and even within the house.

In addition to the objects, features and advantages mentioned above, the present disclosure has other objects, features and advantages. The present disclosure will be further described with reference to the attached drawings.

BRIEF DESCRIPTION OF THE DRAWINGS

The present disclosure will be further illustrated with reference to attached drawing constituting a part of the present application, and the exemplary embodiments of the present disclosure and the descriptions thereof will only be used to describe the present disclosure and should not be construed as an improper limitation to the present disclosure, in which.

Figure 1:
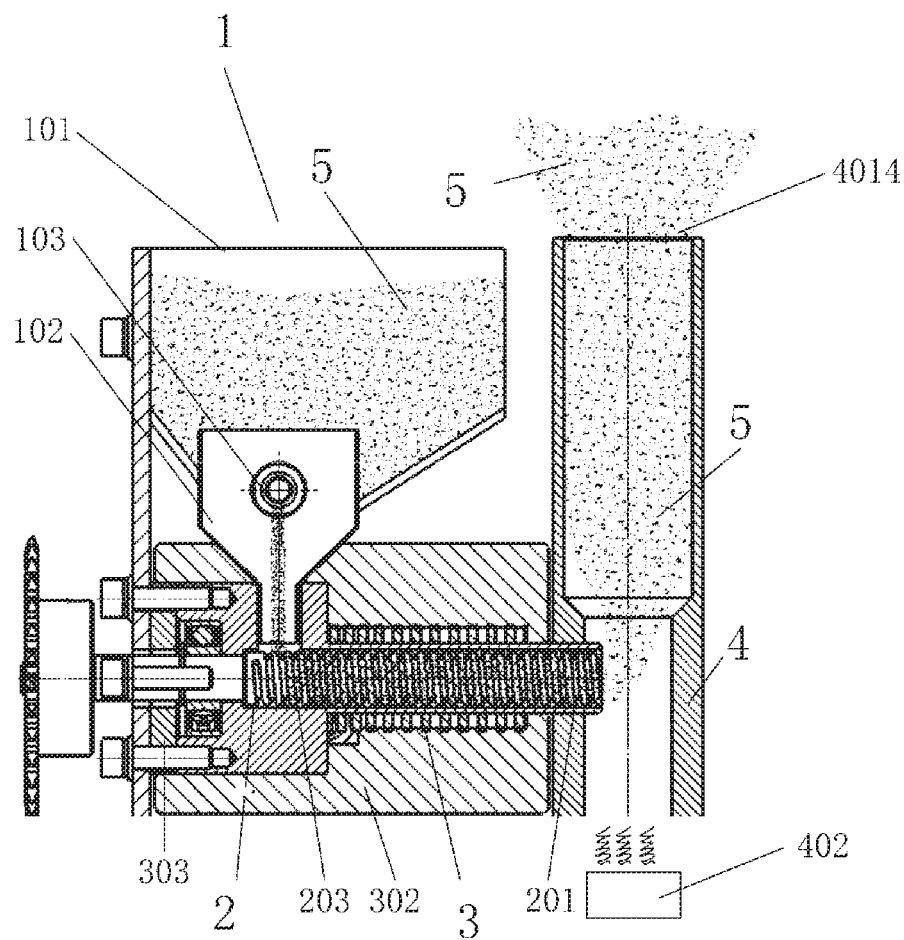
FIG. 1 is a first schematic structure view of a cold firework spurting apparatus according to an preferable embodiment of the present disclosure.

LIST OF THE REFERENCE NUMERALS 1. feeding device; 101 loading hopper; 102 feeding hopper; 103 rotary feeding mechanism; 1031 feeding control tube; 1032 feeding roll shaft; 1033 feeding drive motor; 104 spiral feeding projection structure; 105 spiral feeding recession structure; 106 feeding port; 2 conveying device; 201 conveying channel; 202 material inlet; 203 rotary conveying roll; 204 spiral conveying projection structure; 205 spiral conveying recession structure; 3 heating mechanism; 301 heating loop; 302 thermal insulation sleeve; 303 heat insulation gasket; 4 spurting device; 401 outlet tube; 4011 inlet end; 4012 ignition portion; 4013 spurting portion; 4014 spurting port; 4015 smooth transition segment; 402 blower; 403 anti-adhesion layer; 404 heat insulation gasket near the exit of the blower; 405 heat insulation gasket at the outlet; 5 metal powder

DETAILED DESCRIPTION OF PREFERRED EMBODIMENTS OF THE INVENTION

In order to make the object, technical solution and advantages of the present disclosure clearer, the present disclosure will be further described in detail hereinafter with reference to the accompanying drawings and in combination with specific embodiments.

Figure 2:
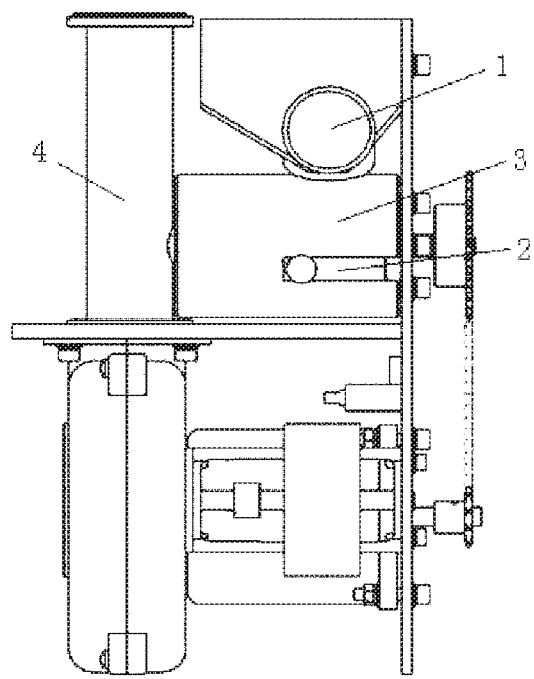
FIG. 2 is a second schematic structure view of the cold firework spurting apparatus according to the preferable embodiment of the present disclosure.
Figure 3:
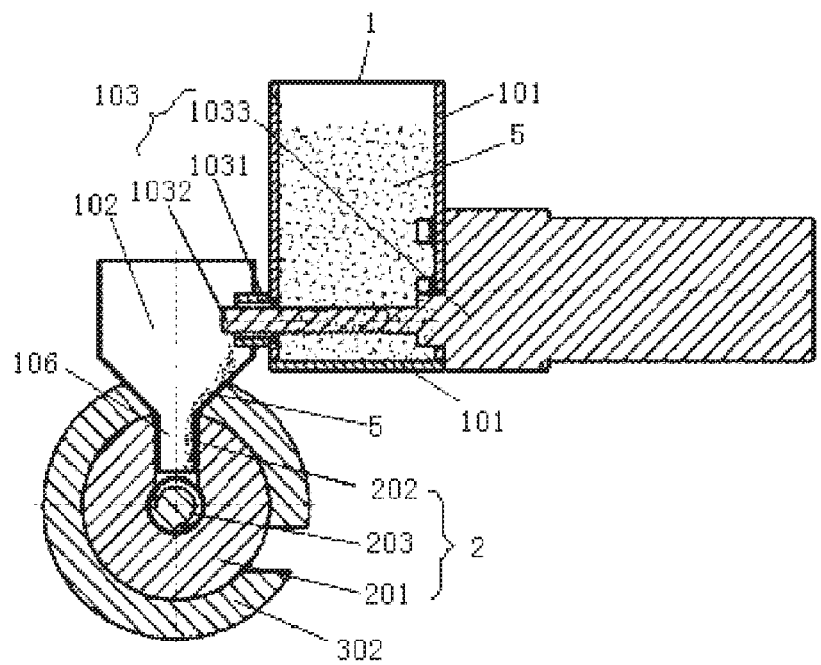
FIG. 3 is a schematic structure view of a feeding device and a conveying device according to the preferable embodiment of the present disclosure.
Figure 4:
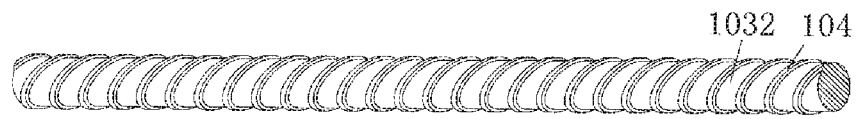
FIG. 4 is a first schematic structure view of a feeding roll shaft according to the preferable embodiment of the present disclosure.
Figure 5:
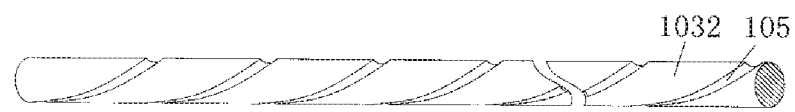
FIG. 5 is a second schematic structure view of the feeding roll shaft according to the preferable embodiment of the present disclosure.
Figure 6:
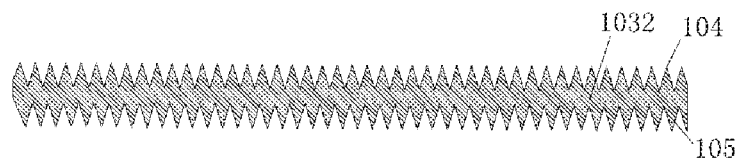
FIG. 6 is a third schematic structure view of the feeding roll shaft according to the preferable embodiment of the present disclosure.
Figure 7:
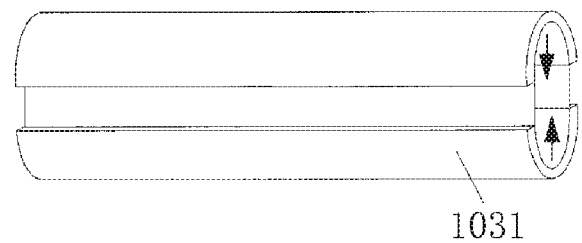
FIG. 7 is a schematic structure view of a feeding control tube according to the preferable embodiment of the present disclosure.
Figure 8:
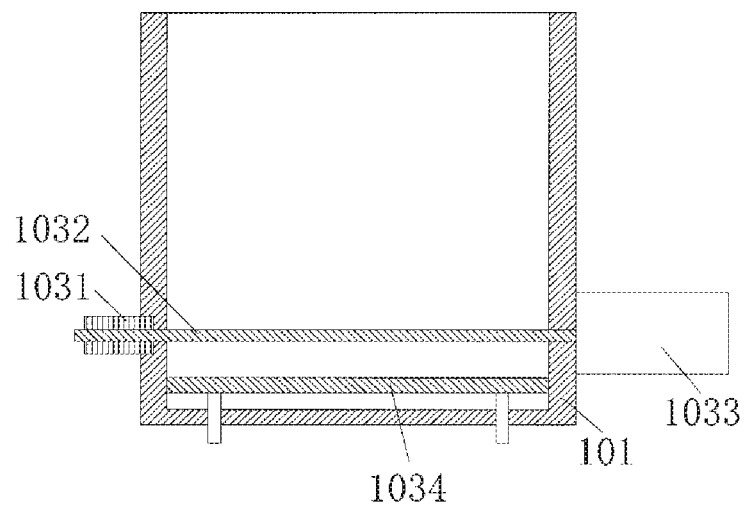
FIG. 8 is a schematic structure view of a loading hopper according to the preferable embodiment of the present disclosure.
Figure 9:
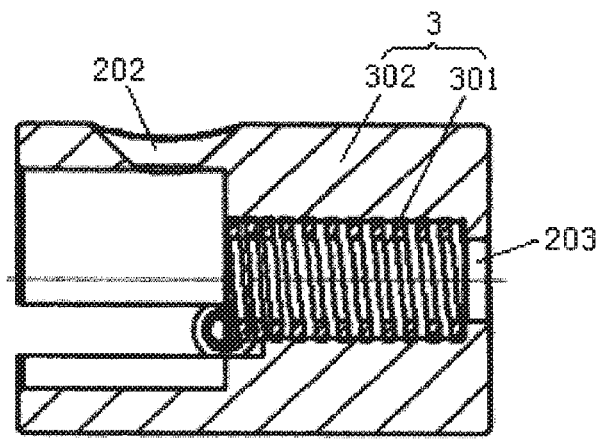
FIG. 9 is a first schematic structure view of the conveying device and a heating mechanism according to the preferable embodiment of the present disclosure.
Figure 10:
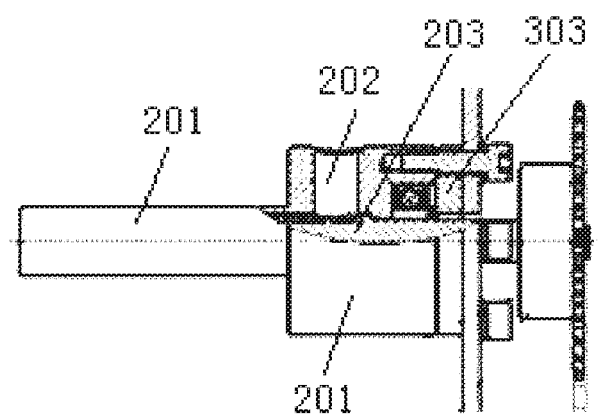
FIG. 10 is a second schematic structure view of the conveying device and the heating mechanism according to the preferable embodiment of the present disclosure.
Figure 11:
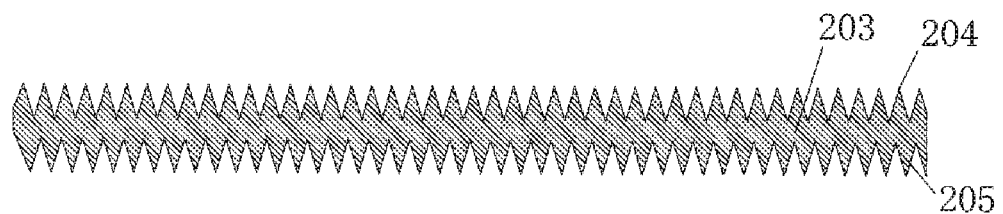
FIG. 11 is a first schematic structure view of a rotary conveying roll according to the preferable embodiment of the present disclosure.
Figure 12:
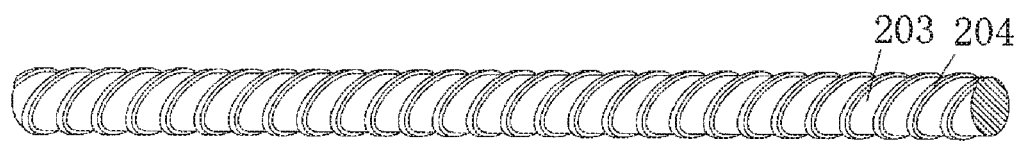
FIG. 12 is a second schematic structure view of the rotary conveying roll according to the preferable embodiment of the present disclosure.
Figure 13:
FIG. 13 is a third schematic structure view of the rotary conveying roll according to the preferable embodiment of the present disclosure.
Figure 14:
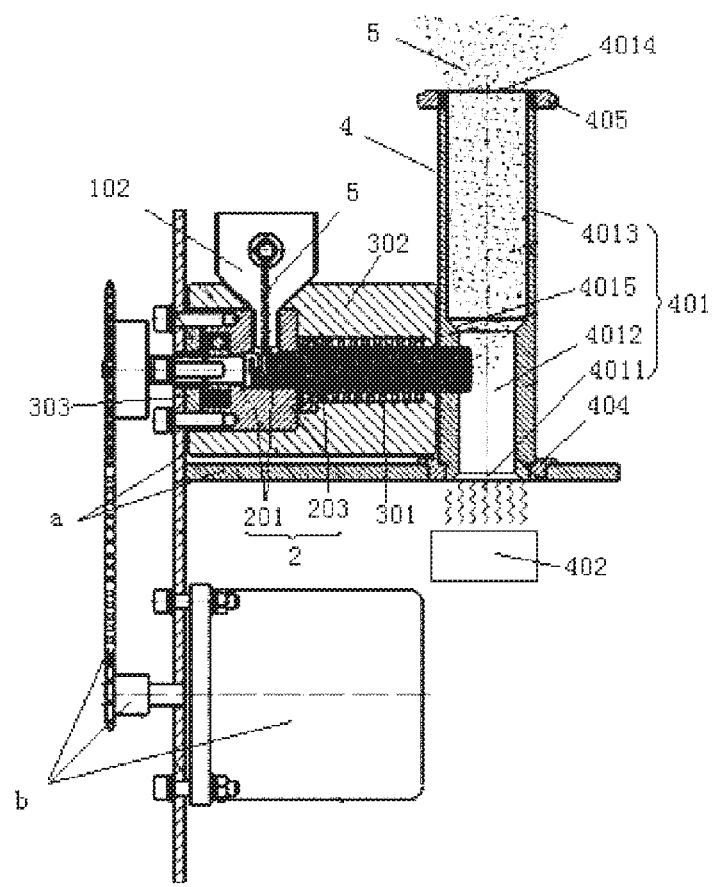
FIG. 14 is a third schematic structure view of the cold firework spurting apparatus according to the preferable embodiment of the present disclosure.
Figure 15:
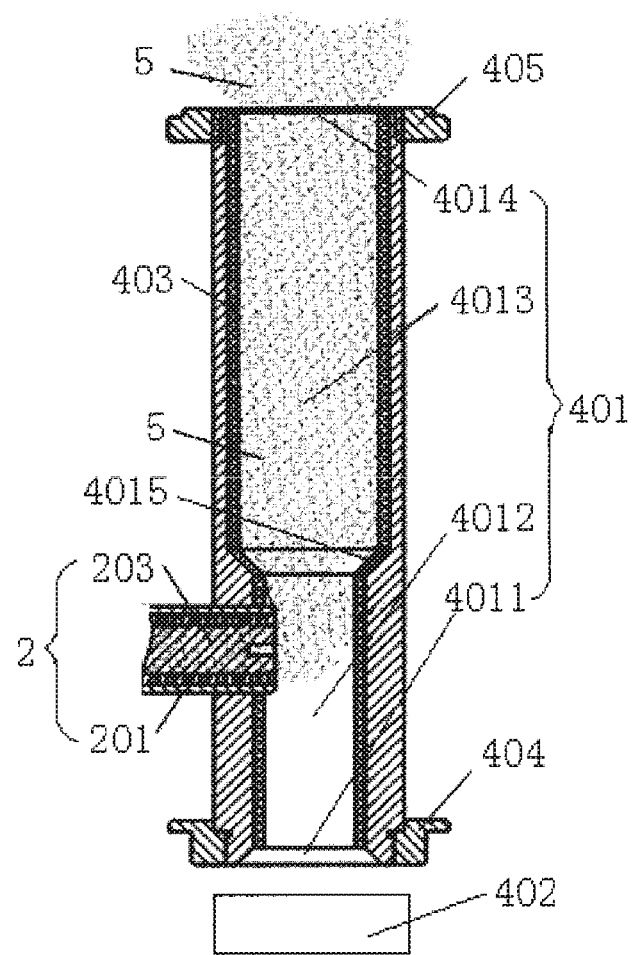
FIG. 15 is a schematic structure view of the conveying device and a spurting device according to the preferable embodiment of the present disclosure.

FIG. 1 is a first schematic structure view of a cold firework spurting apparatus according to an preferable embodiment of the present disclosure; FIG. 2 is a second schematic structure view of the cold firework spurting apparatus according to the preferable embodiment of the present disclosure; FIG. 3 is a schematic structure view of a feeding device and a conveying device according to the preferable embodiment of the present disclosure; FIG. 4 is a first schematic structure view of a feeding roll shaft according to the preferable embodiment of the present disclosure; FIG. 5 is a second schematic structure view of the feeding roll shaft according to the preferable embodiment of the present disclosure; FIG. 6 is a third schematic structure view of the feeding roll shaft according to the preferable embodiment of the present disclosure; FIG. 7 is a schematic structure view of a feeding control tube according to the preferable embodiment of the present disclosure; FIG. 8 is a schematic structure view of a loading hopper according to the preferable embodiment of the present disclosure; FIG. 9 is a first schematic structure view of the conveying device and a heating mechanism according to the preferable embodiment of the present disclosure; FIG. 10 is a second schematic structure view of the conveying device and the heating mechanism according to the preferable embodiment of the present disclosure; FIG. 11 is a first schematic structure view of a rotary conveying roll according to the preferable embodiment of the present disclosure; FIG. 12 is a second schematic structure view of the rotary conveying roll according to the preferable embodiment of the present disclosure; FIG. 13 is a third schematic structure view of the rotary conveying roll according to the preferable embodiment of the present disclosure; FIG. 14 is a third schematic structure view of the cold firework spurting apparatus according to the preferable embodiment of the present disclosure; and FIG. 15 is a schematic structure view of the conveying device and a spurting device according to the preferable embodiment of the present disclosure.

As illustrated in FIGS. 1 and 2, the cold firework spurting apparatus of the present embodiment comprises: a feeding device 1 configured to continuously feed material by continuously propelling metal powder 5 through rotation, a conveying device 2 configured to convey material by continuously propelling the metal powder 5 fed by the feeding device 1 through rotation, a heating mechanism 3 attached to the conveying device 2 and configured to heat the metal powder 5 during the conveying process of the conveying device 2; and a spurting device 4 configured to ignite and spurt the metal powder 5 heated by the heating mechanism 3, wherein an output end of the feeding device 1 is open to the conveying device 2 and an output end of the conveying device 2 is open to the spurting device 4. In the cold firework spurting apparatus, with the feed device 1 (a rotary feeding mechanism 103) continuously rotating, the continuous rotary force is transferred into an axial propelling force so as to propel and convey the metal powder 5 continuously towards the conveying device 2. The metal powder 5 dropped from the feeding device 1 is propelled and conveyed towards the spurting device 4 by the continuous rotation of the conveying device 2 (a rotary conveying roll 203), and the metal powder 5 inside the conveying device is continuously heated by the heating mechanism 3 attached to the conveying device during the conveying process such that the metal powder 5 during the conveying process is constantly heated so as to form the metal powder 5 at high temperature to be ignited at a conveying outlet. The ignited metal powder 5 at high temperature is led and spurted outwards by means of an air flow formed by the spurting device 4 so as to form a spurting effect of cold firework. This kind cold firework spurting apparatus can be used to the indoor or outdoor stage and even within the house. Optionally, the cold firework spurting apparatus also comprises a bracket a (referring to FIG. 14) supporting at least one of the feeding device 1, the conveying device 2, the heating mechanism 3, and the spurting device 4. Metal powder with low ignition point mixed with a specific proportion can be used as the metal powder 5. Preferably, at least one metal powder selected from aluminum, iron, strontium, magnesium, calcium, zirconium, copper and titanium can be used as the metal powder 5, or at least one metallic compound powder selected from aluminum, iron, strontium, magnesium, calcium, zirconium, copper and titanium can be used as the metal powder 5. Optionally, a mixing powder of the above-identified metal powder and the above-identified metallic compound can be used as the metal powder 5. That's to say, the metal powder 5 is gradually heated to a high temperature (reach the ignition point) by the heating mechanism 3 during being conveyed in the conveying device 2, and comes into contact with the gas flow (the air) at the conveying outlet of the conveying device 2 so as to be ignited, and then the ignited metal powder is spurted by the gas flow.

As illustrated in FIGS. 1, 2 and 3, in the present embodiment, the feeding device 1 comprises a loading hopper 101 for storing the metal powder 5 and a feeding hopper 102 for feeding the metal powder 5. The rotary feeding mechanism 103, which continuously propels the metal powder 5 inside the loading hopper 101 into the feeding hopper 102 through circumferential rotation, is provided between a lower portion of the loading hopper 101 and an upper portion of the feeding hopper 102. The rotary feeding mechanism 103 is mounted on the loading hopper 101. An output end of the rotary feeding mechanism 103 is directed to an inside of the feeding hopper 102. An output end of feeding hopper 102 is open to the conveying device 2. The continuous feeding of the metal powder 5 from the loading hopper 101 to the feeding hopper 102 is achieved by providing the rotary feeding mechanism 103 between the loading hopper 101 and the feeding hopper 102 in the feeding device 1, and the rotary feeding mechanism 103 rotates with respect to the metal powder 5 inside the loading hopper 101 such that the metal powder 5 is driven to move towards the feeding hopper 102 by means of a concave-convex structure on the surface of the rotary feeding mechanism 103. This can ensure the continuity and uniformity of the feeding of the metal powder 5 and cause no interruption during the feeding process of the metal powder 5. The feeding amount of the metal powder 5 during the feeding process will remain constant due to the stable rotation and the consistency of the surface structure of the rotators, such that the metal powder 5 is conveyed to the spurting device at constant amount and speed so as to control the spurting effect of the cold firework well and achieve the stage effect of the cold firework well. The output end of feeding hopper 102 is directly connected with the conveying device 2 such that the metal powder 5 fed at constant amount and speed is immediately conveyed to the spurting device and then is spurted outwards, thereby ensuring a well-organized spurting of the cold firework and causing no accumulation and interruption of the metal powder 5.

In addition, as illustrated in FIG. 3, in the present embodiment, the rotary feeding mechanism 103 comprises a feeding control tube 1031 for communicating the loading hopper 101 with the feeding hopper 102, a feeding roll shaft 1032 provided within the feeding control tube 1031 axially and configured to continuously feed the metal powder 5 inside the loading hopper 101 into the feeding hopper 102 through rotation, and a feeding drive motor 1033 for driving the feeding roll shaft 1032 to rotate. A surface of the feeding roll shaft 1032 is provided with continuous spiral feeding projection structures 104 and/or continuous spiral feeding recession structures 105. The feeding roll shaft 1032 is driven by the feeding drive motor 1033 so as to rotate with respect to the metal powder 5 inside the loading hopper 101, such that the metal powder 5 passes through the feeding control tube 1031 and then enters the feeding hopper 102 by means of the concave-convex structure on the surface of the feeding roll shaft 1032, so as to complete the feeding. The feeding amount of the metal powder 5 can be controlled by adjusting a gap between the feeding roll shaft 1032 and the feeding control tube 1031. The feeding speed of the metal powder 5 can be controlled by adjusting a rotation speed of the feeding roll shaft 1032. Optionally, a motor with adjustable output speeds can be used as the feeding drive motor 1033. The rotation speed of the feeding roll shaft 1032 is controlled by changing the output speed of the motor so as to change the feeding amount and feeding speed of the metal powder 5 and in turn change the spurting effect of the cold firework. Optionally, as illustrated in FIG. 6, the surface of the feeding roll shaft 1032 is provided with continuous Spiral feeding projection structures 104 and continuous spiral feeding recession structures 105 which form an alternative structure, such that the surface of the feeding roll shaft 1032 is substantially rose and fell radially so as to increase the propelling force applied on the metal powder 5 optionally, as illustrated in FIG. 4, the surface of the feeding roll shaft 1032 is only provided with continuous Spiral feeding projection structures 104. Optionally, as illustrated in FIG. 5, the surface of the feeding roll shaft 1032 is only provided with continuous Spiral feeding recession structures 105. As mentioned above, the contact area between the surface of the feeding roll shaft 1032 and the metal powder 5 is increased by means of continuous spiral feeding projection structures 104 so as to increase the friction force applied on the surface of the feeding roll shaft 1032 and in turn increase the propelling force in the axial direction applied on the metal powder 5 by the feeding roll shaft 1032. Due to the continuity of the surface structure, the propelling force can be continuously applied on the metal powder 5. Similarly, the contact area between the surface of the feeding roll shaft 1032 and the metal powder 5 is increased by means of continuous Spiral feeding recession structures 105 so as to increase the friction force applied on the surface of the feeding roll shaft 1032 and in turn increase the propelling force in the axial direction applied on the metal powder 5 by the feeding roll shaft 1032. Further, the employed recessed structure can reduce the cross-section size of the conveying path, the material cost and the possibility of the friction between the feeding roll shaft 1032 and the surrounding structures, and thus prolongs the service life.

Furthermore, in the present embodiment, the spiral feeding projection structures 104 are of equal radius or of gradually reduced radius in the direction from the loading hopper 101 to the feeding hopper 102; and/or the spiral feeding recession structures 105 are of equal radius or of gradually increased radius in the direction from the loading hopper 101 to the feeding hopper 102. The interior chamber of the loading hopper 101 is stirred by means of the structure of gradually changed radius so as to eliminate the longtime accumulated metal powder 5. A gradually reduced propelling force in the direction from the loading hopper 101 to the feeding hopper 102 is formed so as to gather the metal powder 5 far away from the loading hopper 101 in the direction towards the feeding hopper 102, thereby improving the utilization rate of the metal powder 5 and prevent the metal powder 5 from accumulating at the corners and keeping unused.

Optionally, the feeding roll shaft 1032 is a lead screw. The constant propelling force applied on the metal powder 5 is formed by the uniform concave-convex structure so as to feed material continuously and uniformly. Optionally, as illustrated in FIGS. 7 and 8, the feeding control tube 1031 is provided with an adjustment mechanism for adjusting a gap between an inner wall of the feeding control tube 1031 and the feeding roll shaft 1032 so as to adjust the feed amount of the metal powder 5. The adjustment mechanism can employ an anchor hoop or a ring hoop mounted on the inner wall of the feeding control tube 1031, and the gap between the inner wall of the feeding control tube 1031 and the feeding roll shaft 1032 can be adjusted. The adjustment mechanism can also employ a moveable wall on the feeding control tube 1031 itself, which is moveable in the radial direction. A completely closing connection can be provided between the moveable wall and a fixed wall and can be made from flexible or elastic material. A seal connection can be provided between the feeding control tube 1031 and the loading hopper 101 and the feeding hopper 102 and can be made from a sealing film, plastic film or elastic film. Optionally, the feeding roll shaft 1032 is arranged almost on a lower surface of the loading hopper 101, and the feeding control tube 1031 is partially overlapped with the lower surface of the loading hopper 101. The feeding roll shaft 1032 is almost on the lower surface of the loading hopper 101, such that the metal powder 5 will be sufficiently used. Optionally, a moveable plate 1034 is provided in the lower portion of the loading hopper 101 so as to adjust a gap between the feeding roll shaft 1032 and the lower surface of the loading hopper 101. The gap between the feeding roll shaft 1032 and the lower surface of the loading hopper 101 can be adjusted by lifting or lowering the moveable plate so as to improve the utilization rate of the metal powder 5 and prevent the metal powder 5 from being left during the feeding process. Optionally, a discharging direction of an output end of the rotary feeding mechanism 103 can be adjusted. The metal powder 5 can be discharged at different angles by adjusting the above discharging direction of the output end so as to control the feeding amount of the metal powder 5 and in turn change the spurting effect of the cold firework.

As illustrated in FIGS. 1, 2, 3, 9, 10, 14 and 15, in the present embodiment, the conveying device 2 comprises a conveying channel 201 for receiving the metal powder 5 continuously dropped from the feeding device 1 and conveying the metal powder 5 to the spurting device 4. The conveying channel 201 is provided with a material inlet 202 arranged to correspond to a feeding port 106 of the feeding device 1. The rotary conveying roll 203, which is arranged in an axial direction of the conveying channel 201 and configured to continuously convey and propel the metal powder 5 dropped from the feeding device 1 to the spurting device 4 through circumferential rotation, is provided within the conveying channel 201. An outer surface of the rotary conveying roll 203 is provided with continuous spiral feeding projection structures 204 and/or continuous spiral feeding recession structures 205 (referring to FIGS. 11 to 13). Optionally, the conveying device 2 is connected with a feeding drive mechanism b for driving the conveying device 2 to run. The conveying device 2 is arranged such that the feeding port 106 is corresponding to the material inlet 202, and thus the metal powder 5 continuously dropped from the feeding device 1 may directly and stably enter the conveying channel 201 and drop on the outer surface of the rotary conveying roll 203. A propelling force in the axial direction of the conveying channel 201 is formed by continuous spiral feeding projection structures and/or continuous spiral feeding recession structures on the outer surface of the rotary conveying roll 203, so as to form a continuous propelling force applied on the metal powder 5, such that the metal powder 5 is driven to be propelled and conveyed stably and continuously from the material inlet 202 to the spurting device 4 by the rotation of the continuous spiral projection structures and/or continuous spiral recession structures, thereby ensuring the continuity and uniformity of the conveying of the metal powder 5. The rotation speed of the rotary conveying roll 203 is controlled so as to easily control the spurting effect of the cold firework and achieve the stage effect of the cold firework well.

As illustrated in FIGS. 11 to 13. in the present embodiment, the spiral feeding projection structures 204 are of equal radius or of gradually reduced radius in the direction from the material inlet 202 to the spurting device 4; and/or the spiral feeding recession structures 205 are of equal radius or of gradually increased radius in the direction from the material inlet 202 to the spurting device 4. The force applied on a wall of the conveying channel 201 by the rotary conveying roll 203 is reduced so as to prolong the service life of the conveying channel 201.

As illustrated in FIGS. 1, 9 and 14, in the embodiment, the heating mechanism 3 comprises a heating loop 301 close to an outer wall of the conveying channel 201. The heating loop 301 is distributed from the material inlet 202 to the spurting device 4. The heating loop 301 generates heat with an alternative current or an electro-magnetic induction, and is provided outside with a thermal insulation sleeve 302 for insulation and preventing the heat from leakage. At least one end of the conveying channel 201 is provided with a heat insulation gasket 303 for insulation and preventing the heat from leakage.

Optionally, the rotary conveying roll 203 is a cylindrical straight roll of completely equal roll radius, and the propelling force thus will remain constant, such that the metal powder 5 will be conveyed uniformly and stably. Optionally, the rotary conveying roll 203 is a variable cross-section roll of gradually increased radius in the direction from the material inlet 202 to the spurting device 4, and thus the propelling force applied on the metal powder 5 by the rotary conveying roll 203 is gradually reduced in the direction from the material inlet 202 to the spurting device 4 so as to improve the propelling efficiency and utilization rate of the metal powder 5 and efficiently prevent the metal powder 5 from being accumulated within the conveying channel 201. Optionally, the spiral feeding projection structures 204 are of equal radius, and the propelling force thus will remain constant, such that the metal powder 5 will be conveyed uniformly and stably. Optionally, the spiral feeding projection structures 204 are of gradually increased radius in the direction from the material inlet 202 to the spurting device 4, and thus the propelling force applied to the metal powder 5 by the rotary conveying roll 203 is gradually reduced in the direction from the material inlet 202 to the spurting device 4 so as to improve the propelling efficiency and utilization rate of the metal powder 5 and efficiently prevent the metal powder 5 from being accumulated within the conveying channel 201. Optionally, the spiral feeding recession structures 205 are of equal radius, and the propelling force thus will remain constant, such that the metal powder 5 will be conveyed uniformly and stably. Optionally, the spiral feeding recession structures 205 are of gradually increased radius in the direction from the material inlet 202 to the spurting device 4, and thus the propelling force applied on the metal powder 5 by the rotary conveying roll 203 is gradually reduced in the direction from the material inlet 202 to the spurting device 4 so as to improve the propelling efficiency of the metal powder 5. Optionally, the rotary conveying roll 203 is a lead screw Accordingly, the structure is simple and the propelling force will keep constant, such that the metal powder 5 will be conveyed uniformly and stably.

As illustrated in FIGS. 1, 14 and 15, in the present embodiment, the spurting device 4 comprises an outlet tube 401 for spurting the ignited metal powder 5 by a gas flow. The outlet tube 401 comprises an inlet end 4011 for communicating with an exit of the blower 402, an ignition portion 4012 for receiving and igniting the metal powder 5 at high temperature, a spurting portion 4013 for spurting out the ignited metal powder 5, and a spurting port 4014 for spurting cold fireworks outwards. The ignition portion 4012 and the spurting portion 4013 are coaxially arranged, A first end (a lower end) of the ignition portion 4012 is open to the exit of the blower 402 via the inlet end 4011. The second end (an upper end) of the ignition portion 4012 is open to a first end (a lower end) of the spurting portion 4013, and a second end (an upper end) of the spurting portion 4013 is open to an outside environment via the spurting port 4014. An output end of the conveying device 2 is open to the inside of the ignition portion 4012 via a side wall of the ignition portion 4012, An inner wall of the outlet tube 401 is provided with at least one anti-adhesion layer 403 for preventing the metal powder 5 from adhering to the inner wall of the outlet tube 401 and being resistant to high temperature. The spurting device 4 forms an opening for spurting cold fireworks by providing the outlet tube 401, one end of which is open to the blower 402. The blower 402 blows air into the outlet tube 401 so as to form the gas flow in the outlet tube, and then the heated metal powder 5 entering the outlet tube 401 is ignited and spurted outwards as the gas flow flows so as to form a spurting effect of cold firework. The inner wall of the outlet tube 401 is provided with the anti-adhesion layer 403 for preventing the metal powder 5 at high temperature from forming a nodule and resultant blockage. Optionally, the blower 402 employs a blower with adjustable rotation speeds so as to adjust the spurting height of cold firework.

As illustrated in FIGS. 1, 14 and 15, in the present embodiment, the ignition portion 4012 has a radius less than that of the spurting portion 4013 so as to form a flaring structure in the direction from the ignition portion 4012 to the spurting portion 4013. The ignited metal powder 5 within the outlet tube 401 is sucked out by an abruptly increased suction due to the change of the radiuses so as to be completely spurted out of the outlet tube 401. A smooth transition segment 4015 is provided between the ignition portion 4012 and the spurting portion 4013 so as to change the gas flow direction and efficiently prevent the metal powder from forming a nodule and thus completely blow the metal powder 5 within the outlet tube 401 out. The inlet end 4011 of the outlet tube 401 is provided with a heat insulation gasket 404 neat the exit of the blower for preventing the heat inside the outlet tube 401 from diffusing towards the blower 402, and/or the spurting port 4014 of the outlet tube 401 is provided with a heat insulation gasket 405 at the outlet for preventing the heat inside the outlet tube 401 from diffusing outwards. Optionally, the smooth transition segment 4015 can be replaced with a mutation transition segment.

As illustrated in FIGS. 1, 14 and 15, in the present embodiment, the anti-adhesion layer 403 can be a sprayed layer sprayed on the inner wall surface of the outlet tube 401, and also can be a layer adhered on the inner wall surface of the outlet tube 401. Further, the anti-adhesion layer 403 can be a layer of polytetrafluoroethylene or a layer of Teflon.

According to the above-mentioned structure, in this cold firework spurting apparatus, when feeding material, a push rod is replaced with the lead screw (the rotary feeding structure 103), and the metal powder 5 can slide onto the conveying lead screw (the rotary conveying roll 203) uniformly, continuously and smoothly by the uniform rotation speed of the feeding drive motor 1033 and the conveying drive motor b, the feeding buffer result from the feeding hopper 102, and the gap between the feeding control tube 1031 and the feeding lead screw (the feeding roll shaft 1032), such that the problems regarding to un-continuity and instability of the feeding will be solved.

Due to the lead screw structure of the feeding lead screw (the feeding roll shaft 1032), the gap between the feeding lead screw (the feeding roll shaft 1032) and lower portion of the loading hopper 101 can be adjusted such that the metal powder 5 within the loading hopper 1 can be completely fed into the conveying device 2 so as to solve the problem that the metal powder 5 is left during the feeding process.

Due to the structure property of the feeding device 1, the metal powder 5 can slide onto the conveying lead screw (the rotary conveying roll 203) from the feeding hopper 102 uniformly, continuously and smoothly. Furthermore, due to the lead screw structure of the conveying lead screw (the rotary conveying roll 203), the uniform rotation speed of the conveying drive motor b, the gap between the conveying lead screw (the rotary conveying roll 203) and the conveying tube (the conveying channel 201), and the control for the rotation speed of the conveying lead screw (the rotary conveying roll 203), the uniformity, stability and continuity of the conveying of the metal power 5 on the conveying lead screw (the rotary conveying roll 203) can be controlled, such that the problems regarding to un-continuity and instability of the flame spurting will be solved.

Instead of the structure comprising an electromagnet and the push rod, a speed-variable motor and a lead screw can be used in the feed device 1 to feed material, and thus the noise generated when the electromagnet engages with the push rod can be eliminated, and the noise generated during the feeding process will be substantially damped. The cold firework spurting apparatus uses a chain-sprocket transmission structure, which can work in a very harsh environment and substantially reduce the generation of the noise.

The metal powder 5 fed from the feeding device 1 can be delivered uniformly and continuously to the surface and the thread grooves of the conveying lead screw (the rotary conveying roll 203) so as to increase the contact area between the metal powder 5 and the heating mechanism 3. Furthermore, due to the heat preservation of the thermal insulation sleeve 302 of the heating loop 301, the temperature in the heating area on the conveying lead screw (the rotary conveying roll 203) will keep constant so as to ensure that the metal powder 5 will be sufficiently ignited.

The heat generated by the heating loop 301 will be sealed inside a cavity and prevented from being transferred to other areas by the thermal insulation sleeve 302 of the heating loop 301 and the heat insulation gasket 303 for the lead screw, such that the temperature in the heating area on the conveying lead screw (the rotary conveying roll 203) will keep constant and the structure has a function of heat preservation.

The ignited metal powder 5 will reach the outlet tube 401 and may extinguish when running into low temperature so as to affect adversely the status and appearance of the cold firework. Accordingly, the heat insulation gasket 404 neat the exit of the blower and the heat insulation gasket 405 at the outlet are provided at both ends of the outlet tube 401 and made from heat-resistant and insulation material so as to prevent the heat from being transferred to other areas, and keep the temperature in the outlet tube 401 constant and in turn prevent the metal powder 5 from extinguishing.

The ignited metal powder 5 tends to adhere to the metal surface such that the metal powder 5 will form a nodule at the area having a nodule forming tendency and other areas of the outlet tube 401, and thus the smooth spurting of the gas flow in the outlet tube 401 and the appearance of the cold firework will be compromised. In view of this, the inner wall of the outlet tube 401 is sprayed with a sprayed layer made from an anti-adhesion material having the properties of non-adhesion, anti-moisture, corrosion-resistance, wear-resistance and low friction coefficient, such as polytetrafluoroethylene, Teflon and the like. By spraying an anti-adhesion material on the outlet tube 401, it is efficient to prevent the ignited metal powder 5 from forming a nodule at the area having a nodule forming tendency and other areas.

Since the metal powder 5 has a certain weight, the ignited metal powder 5 cannot be completely blown out of the outlet tube 401, and a few of the ignited metal powder 5 will drop into the blower 402 so as to compromise the performance thereof. A radius-changed structure is formed at the position where the conveying lead screw (the rotary conveying roll 203) is located in the outlet tube 401, such that the heated metal powder 5 within the conveying tube (the conveying channel 201) is sucked out by an abruptly increased suction result from the change of the radius so as to be completely spurted out of the outlet tube 401.

The above mentioned embodiments further describe the objects, technical solution and advantages of the present invention. However, it should be understood that they are only preferred embodiment of the present disclosure and are not intended to limit the present disclosure thereto. Any modification, equivalent, improvement and the like within the spirit and principle of the present disclosure should be incorporated in the protection scope of the present disclosure.

What is claimed is:

1. A cold firework spurting apparatus, characterized in that, the cold firework spurting apparatus comprises:
a feeding device configured to continuously feed material by continuously propelling metal powder through rotation;
a conveying device configured to convey material by continuously propelling the metal powder fed by the feeding device through rotation;
a heating mechanism attached to the conveying device and configured to heat the metal powder during the conveying process of the conveying device; and
a spurting device configured to ignite and spurt the metal powder heated by the heating mechanism,
wherein an output end of the feeding device is open to the conveying device and an output end of the conveying device is open to the spurting device, and
wherein the feeding device comprises a loading hopper for storing the metal powder and a feeding hopper for feeding the metal powder.

2. The cold firework spurting apparatus according to claim 1, wherein,
a rotary feeding mechanism, which continuously propels the metal powder inside the loading hopper into the feeding hopper through circumferential rotation, is provided between a lower portion of the loading hopper and an upper portion of the feeding hopper,
the rotary feeding mechanism is mounted on the loading hopper,
an output end of the rotary feeding mechanism is directed to an inside of the feeding hopper, and
an output end of the feeding hopper is open to the conveying device.

3. The cold firework spurting apparatus according to claim 2, wherein,
the rotary feeding mechanism comprises a feeding control tube for communicating the loading hopper with the feeding hopper, a feeding roll shaft axially provided within the feeding control tube and configured to continuously feed the metal powder inside the loading hopper into the feeding hopper through rotation, and a feeding drive motor for driving the feeding roll shaft to rotate; and
a surface of the feeding roll shaft is provided with continuous spiral feeding projection structures and/or continuous spiral feeding recession structures.

4. The cold firework spurting apparatus according to claim 3, wherein,
the spiral feeding projection structures are of equal radius or of gradually reduced radius in the direction from the loading hopper to the feeding hopper; and/or
the spiral feeding recession structures are of equal radius or of gradually increased radius in the direction from the loading hopper to the feeding hopper.

5. The cold firework spurting apparatus according to claim 1, wherein,
the conveying device comprises a conveying channel for receiving the metal powder continuously dropped from the feeding device and conveying the metal powder to the spurting device,
the conveying channel is provided with a material inlet arranged to correspond to a feeding port of the feeding device,
a rotary conveying roll, arranged in an axial direction of the conveying channel and configured to continuously convey and propel the metal powder dropped from the feeding device to the spurting device through circumferential rotation, is provided within the conveying channel; and
an outer surface of the rotary conveying roll is provided with continuous spiral feeding projection structures and/or continuous spiral feeding recession structures.

6. The cold firework spurting apparatus according to claim 5, wherein,
the spiral feeding projection structures are of equal radius or of gradually reduced radius in the direction from the material inlet to the spurting device; and/or
the spiral feeding recession structures are of equal radius or of gradually increased radius in the direction from the material inlet to the spurting device.

7. The cold firework spurting apparatus according to claim 5, wherein,
the heating mechanism comprises a heating loop close to an outer wall of the conveying channel,
the heating loop is distributed from the material inlet to the spurting device (4),
the heating loop is provided outside with a thermal insulation sleeve for insulation and preventing the heat from leakage,
the heating loop generates heat with an alternative current or an electro-magnetic induction,
at least one end of the conveying channel is provided with a heat insulation gasket for insulation and preventing the heat from leakage.

8. The cold firework spurting apparatus according to claim 1, wherein,
the spurting device comprises an outlet tube for spurting the ignited metal powder by a gas flow,
the outlet tube comprises an inlet end for communicating with an exit of the blower, an ignition portion for receiving and igniting the metal powder at high temperature, a spurting portion for spurting out the ignited metal powder, and a spurting port for spurting cold fireworks outwards;
the ignition portion and the spurting portion are coaxially arranged,
a first end of the ignition portion is open to an exit of the blower via the inlet end,
the second end of the ignition portion is open to a first end of the spurting portion, and a second end of the spurting portion is open to an outside environment via the spurting port,
an output end of the conveying device is open to an inside of the ignition portion from a side wall of the ignition portion,
an inner wall of the outlet tube is provided with at least one anti-adhesion layer for preventing the metal powder from adhering to the inner wall of the outlet tube and being resistant to high temperature.

9. The cold firework spurting apparatus according to claim 8, wherein,
the ignition portion has a radius less than that of the spurting portion so as to form a flaring structure in the direction from the ignition portion to the spurting portion;
a smooth transition segment or a mutation transition segment is provided between the ignition portion and the spurting portion;
the inlet end of the outlet tube is provided with a heat insulation gasket neat the exit of the blower for preventing the heat inside the outlet tube from diffusing towards the blower, and/or the spurting port of the outlet tube is provided with a heat insulation gasket at the outlet for preventing the heat inside the outlet tube from diffusing outwards.

10. The cold firework spurting apparatus according to claim 8, wherein, the anti-adhesion layer is a sprayed layer sprayed on an inner wall surface of the outlet tube, or a layer adhered on the inner wall surface of the outlet tube, and the anti-adhesion layer is a layer of polytetrafluoroethylene or a layer of Teflon.

* * * * *